Aug. 1, 1933.    R. BAADER    1,920,339
FISH DRESSING MACHINE
Filed April 14, 1930    7 Sheets-Sheet 1

Aug. 1, 1933.    R. BAADER    1,920,339
FISH DRESSING MACHINE
Filed April 14, 1930    7 Sheets-Sheet 2

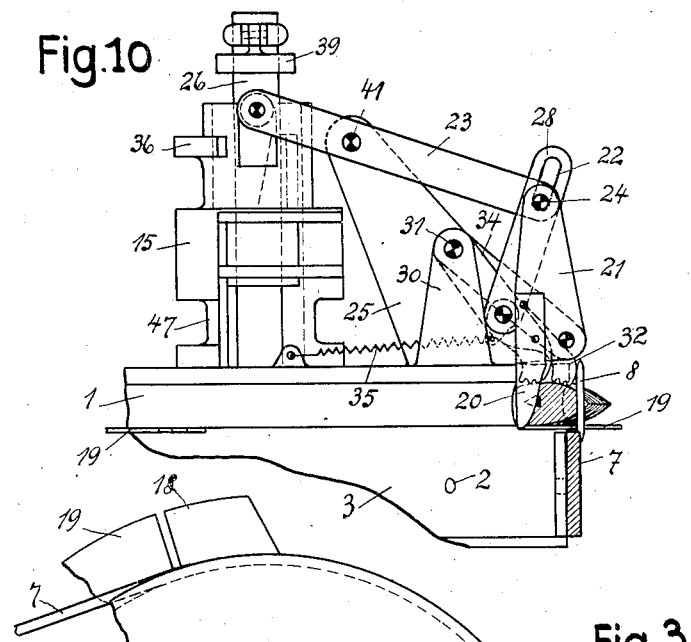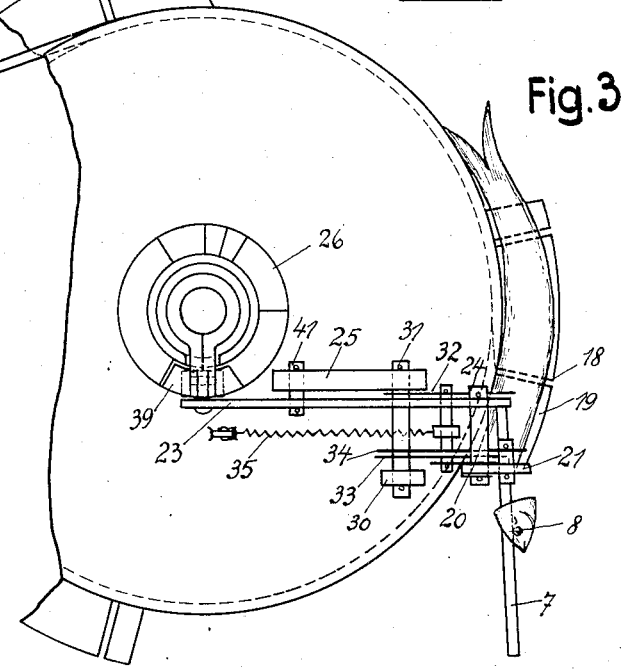

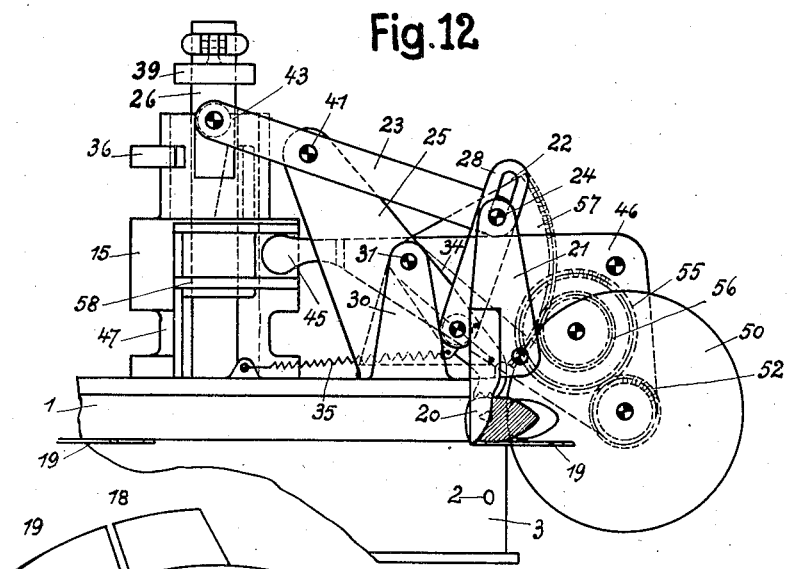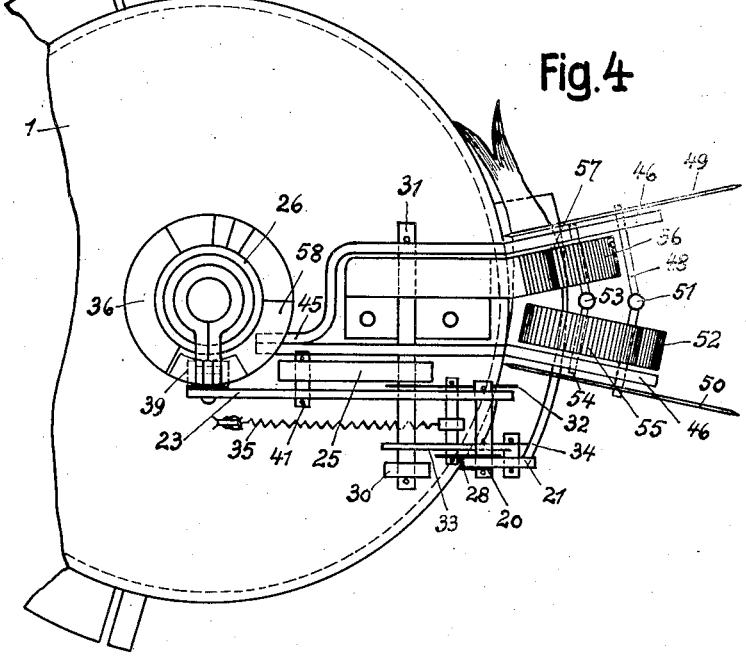

Aug. 1, 1933.  R. BAADER  1,920,339
FISH DRESSING MACHINE
Filed April 14, 1930  7 Sheets-Sheet 5
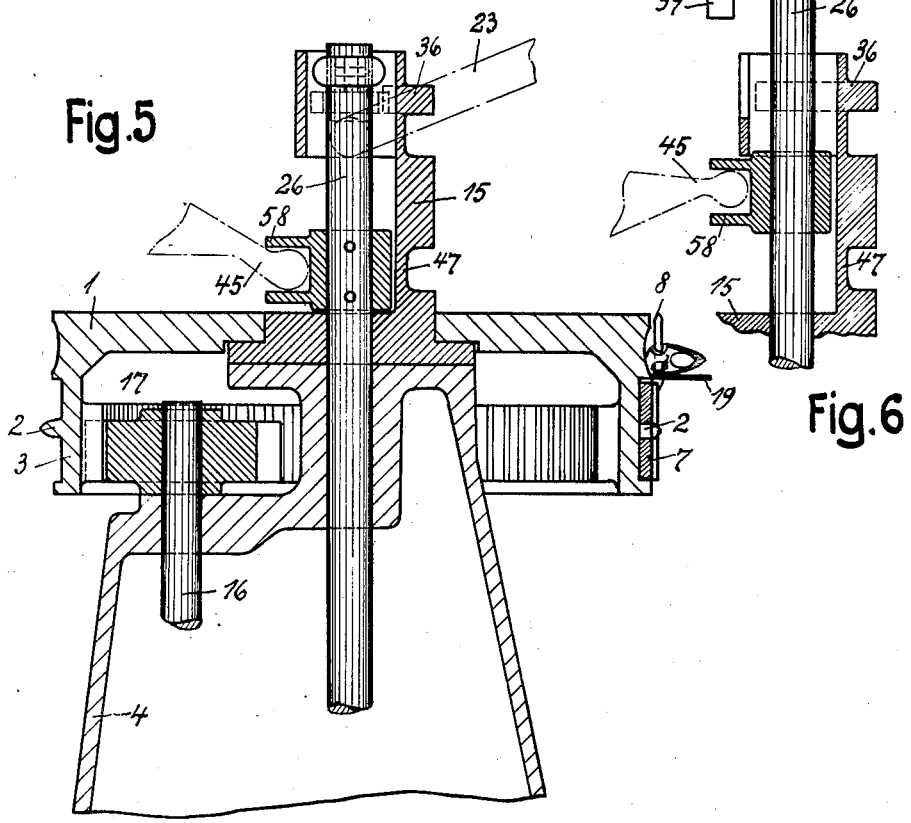

Aug. 1, 1933.   R. BAADER   1,920,339
FISH DRESSING MACHINE
Filed April 14, 1930   7 Sheets-Sheet 6

Inventor:
Rudolf Baader

Aug. 1, 1933.    R. BAADER    1,920,339
FISH DRESSING MACHINE
Filed April 14, 1930    7 Sheets-Sheet 7

Inventor:
Rudolf Baader
by  Paul ...
Attorney

Patented Aug. 1, 1933

1,920,339

UNITED STATES PATENT OFFICE 1,920,339

FISH DRESSING MACHINE

Rudolf Baader, Lubeck, Germany

Application April 14, 1930, Serial No. 444,292, and in Germany June 19, 1929

12 Claims. (Cl. 17—4.)

Applications have been filed in Germany on June 19, 1929 and in Great Britain December 13, 1929.

This invention relates to a machine for cutting open, cleaning, boning, nobbing and cutting up fishes which can be worked both fresh and also salted.

In such fish treating machines in which the fishes are cut open, cleaned and filleted in a horizontally circulating working operation, the fish, the heads of which having been removed in a previous separate operation, are worked from the tail which is bent over and held by a clamping lever. When bending the tail fin it sometimes happens that the back bone breaks at the tail root, so that the tail fin tears off, and the fish loses its hold. Moreover it is not possible to cut off the tail fin, to nob the fish, i. e. to remove the head together with the entrails, without cutting open the stomach and to cut the fish into pieces. Moreover it is often necessary to work the fish from the head because the belly bones and the spikes of the back fins extend at an acute angle towards the rear, so that the work of the tools, when done from the head, extends in the direction of the bone structure.

Even if the known fish working machines as described above are not open to any serious objections, the present invention nevertheless shows a new way, which consists particularly in the feeding of the fish to the tools and in the devices, by means of which the fish is nobbed and cut up, in conjunction with the devices by means of which it is held when being worked.

The fundamental idea of the invention consists in gripping the fish by the head, in feeding them, lying free on a table, partly in a straight line and partly in circulation to the tools, thereby enabling the tools to engage on all sides.

Owing to this measure the fish can be either opened by cutting off the belly strip with the belly fins, cleaned, boned, nobbed and the trunk cut in pieces, a knife for cutting off the tail fin and cutting out the back fin being also provided if required, or the nape with the back bone is cut through without cutting open the fish, and then the head removed from the trunk together with the entrails, the trunk being then cut into pieces. Consequently by this method the fishes can either be cut open, cleaned, boned and nobbed and, if necessary, cut into two fillet halves in one operation, or they are nobbed, i. e. the head is cut off and then torn off, the entrails being pulled out of the closed belly cavity, whereupon the trunk is cut into pieces for the purpose of making fish marines.

The arrangement also enables the fishes to be worked from the tail, in that they are spiked with their tail fin or tail root on the prongs of the circulating band or securely held in suitable manner.

Moreover the machine can be of comparatively small size, so that whilst requiring a small space a large output is obtained, this being of considerable importance if the machine is fitted in the limited space of a ship.

An embodiment of the invention is illustrated by way of example in the accompanying drawings in which:

Figs. 3 and 4 show on a larger scale the turn table in a top elevation.

Fig. 5 shows the machine frame in vertical section.

Fig. 6 shows the cam guide for the tools in vertical cross section.

Fig. 7 shows the conveyor band for the fish in side elevation.

Figs. 8, 9 and 10 show the tool for nobbing the fish, each in side elevation.

Figs. 11 and 12 show the tool for cutting the fish into pieces, each in one side elevation.

Figure 1:
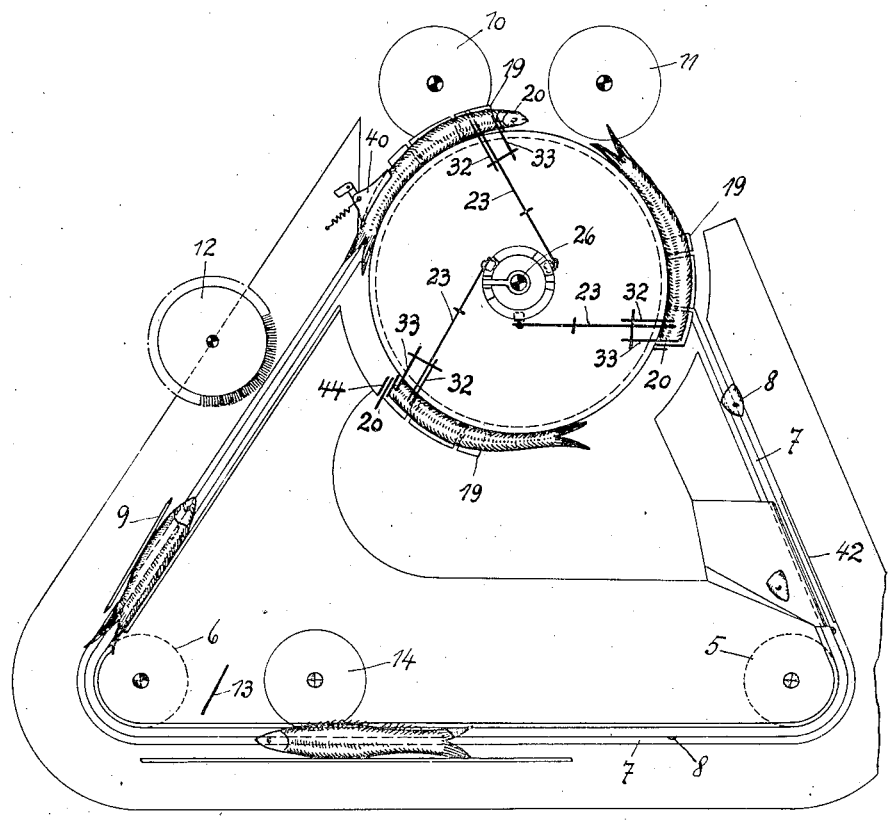
Figs. 1 and 2 show the fish-working machine each in a top plan view.

The machine consists of a horizontally rotating turn table 1, such as known in fish working machines, the edge of which is provided with an annular groove and the underpart of which forms a belt pulley 3 provided with projections 2. Two further guide discs 5 and 6 are rotatably mounted on the machine frame 4 in such a manner that the endless band (or the chain) 7, provided with a number of vertically projecting prongs 8 arranged at a suitable distance apart and openings for the projections 2 of the belt pulley 3, forms seen from above a triangle in the point of which the turn table 1 is arranged.

Besides the endless band 7 or the disc 1 knives 9, 10 and 11 are arranged on one side for cutting off or shearing off the belly strip with the belly fins and for cutting out the back bone, also together with the belly bones, as also the brush 12 and other tools for cleaning the belly cavity. All these tools are known both as regards their arrangement as also their operation. However on the other side knives 13, 14 may be arranged for cutting off the tail fin and for removing the back fins. All tools for carrying out the above operations are adjustable, so that they can be disengaged from the flesh either individually or together. However, as they do not form the subject matter of the invention, they are not shown in detail but only their position relative to the circulating parts holding the fish is shown.

On the table 1 a number of tools, according to the size of the machine, in the example shown in the drawings three, actuated by cams and coming into operation successively during the rotation of the turntable, are arranged for cutting off the heads of the fish and holding same during the cutting off operation. The turntable 1 moves around a hollow axle 15 rigidly connected with the machine frame 4, through which axle a vertical rod 26, shiftable in vertical direction, is guided, which is operated by a cam disc not shown in the drawings.

The belt pulley 3 rigidly connected with the turntable 1 has internal teeth (Fig. 5) in which a toothed wheel 17, mounted on the axle 16 effecting the drive, engages, from which the turntable 1 and therefore also the band or chain 7 receive their circulating movement. On the lower edge of the turntable 1 a number of surfaces 19 having incisions 18 according to the number of heading knives are provided as recess for the fish.

Decapitating knives 20 are exchangeably connected with a bar 21 (Fig. 3), which is pivotable on a pin 24 mounted in a lever bar 23. The lever bar 23 is pivotally mounted on a shaft 41, journalled on a bracket 25 (30) rigidly mounted on the turntable, and the free end of this bar is provided with a roller 43 which, when the turntable rotates, runs under a bar 36 of the hollow axle 15. On the pin 24 of the lever bar 23 a link 28 having an elongated hole 22 is mounted, said link being further pivotally connected with grippers 32, 33 oscillatably mounted on a shaft 31 journalled in the brackets 25, 30. The knife bar 21 is oscillatably connected with the shaft 31 through a link 34, and the grippers 32, 33 are loaded by a spring 35.

The bar 36 arranged in the hollow axle 15 as controlling element for the lever bar 23 ends at 37, where a curve 38 joins it. The bar 36 has a movable section 39 rigidly connected with the rod 26.

On the shaft 31, on which the grippers 32, 33 are mounted, a forked bar 45, 46 is arranged one arm 45 of which lies in a guide 47 of the hollow axle 15, whereas the other forked arm 46 carries two or more disc knives 49, 50 rigidly mounted on the shaft 48. It is advisable that the knives 49, 50 are set radially to the turntable 1, the shaft 48 having then a ball joint 51. A spur wheel 52 is keyed on the shaft 48 and meshes with a spur wheel 55 keyed on a shaft 54 also provided with a ball joint 53. A spur wheel 56 meshing with a toothed segment 57 fixed on the turntable 1 is keyed on the shaft 54.

A section 58 of the guide 47 is rigidly connected with the rod 26 and moves up and down with same, the upward movement occurring at the moment when a fish has to be cut. The section 58 carries along the arm 45 in its upward movement, so that the arm 46 swings downwards causing the knives 59, 50 to descend and to pass through the incisions 18 of the surfaces 19. When the arm 46 descends, the spur wheel 56 rolls on the toothed segment 57 so that the shaft 54 is rotated and transmits its movement through the transmission wheel 55 to the spur wheel 52 and therefore to the disc knives 49, 50.

Figure 2:
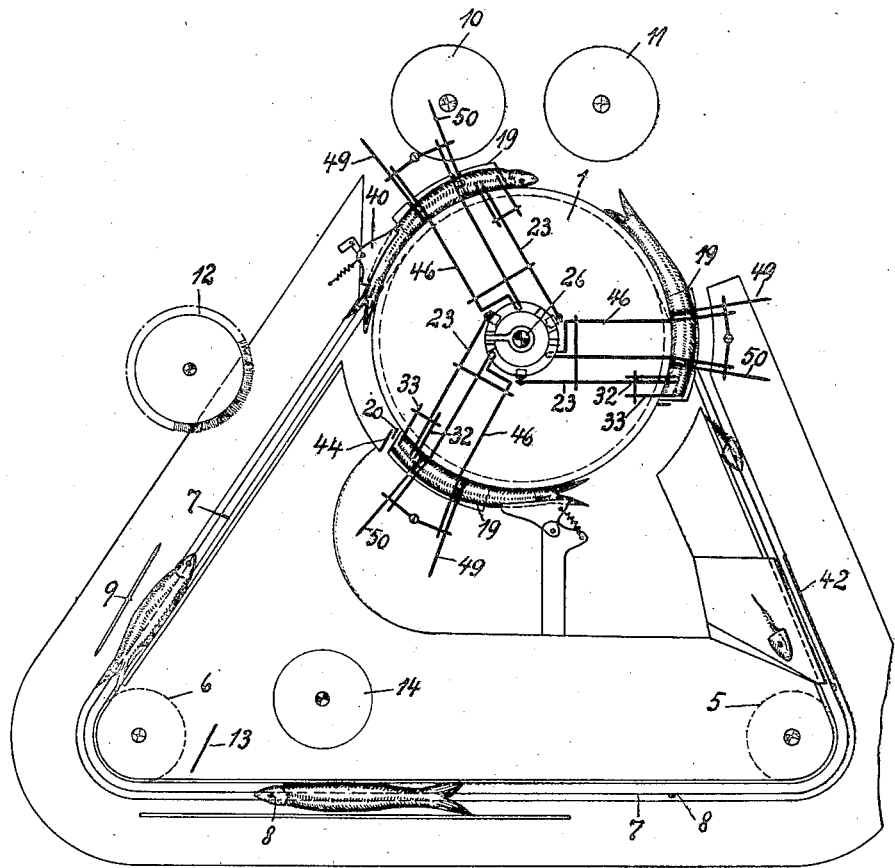

The fishes to be treated are spiked through the eyes on the spikes 8 of the band 7 driven by the turntable 1, the inserting point for the fish being arranged on the base of the band triangle. The fishes are so placed that their belly is directed towards the outer side (Figs. 1 and 2).

The fish then passes by the knife 9 in a straight line, the knife cutting open the belly whereupon the belly cavity is cleaned by the brush 12. The fish then reaches the turntable 1 where, owing to the pressure of a spring loaded guide 40, it is pressed with its back in the edge groove of the turntable 1 and at the same time flat on the surface 19. The fish then encounters the boning knives 10, 11, which remove the back bone, if necessary in conjunction with the belly bones (Fig. 1).

Figure 8:
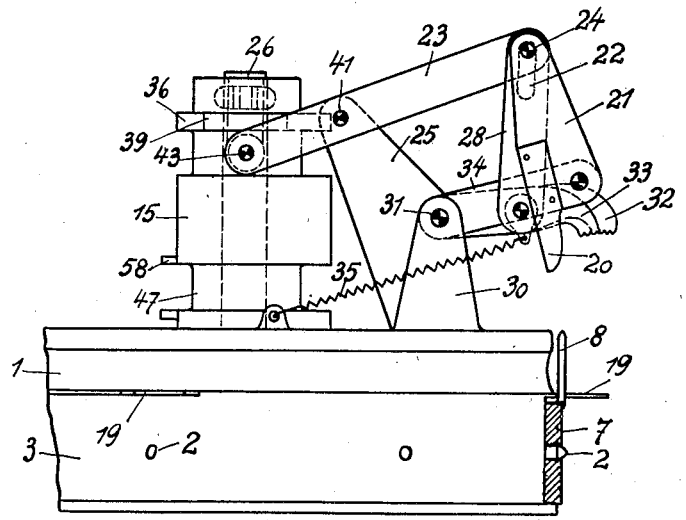
Figure 9:
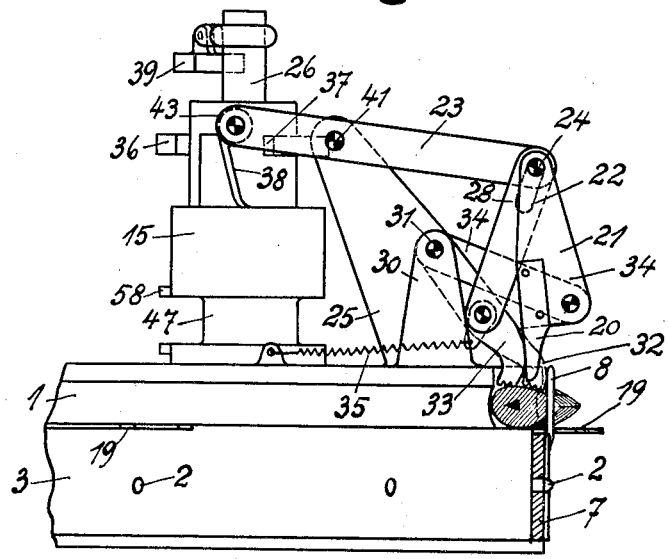
Figure 11:
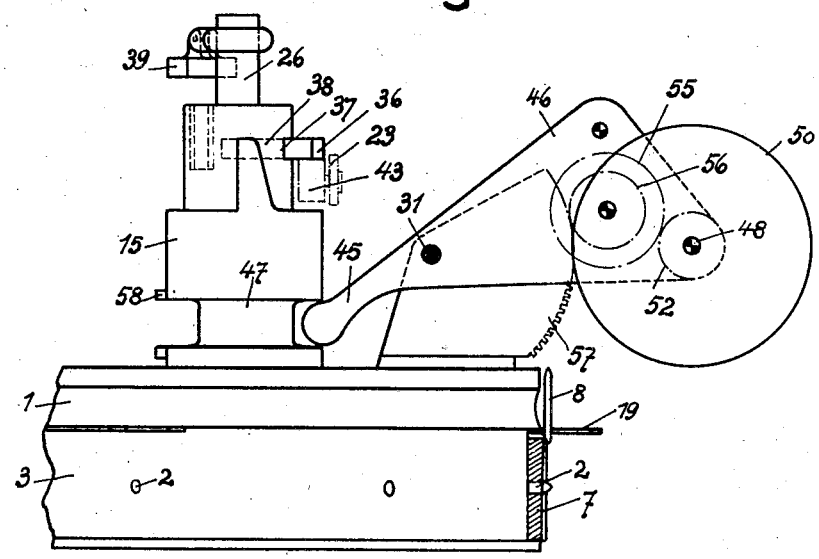

The decapitating knives 20 cut laterally by the surfaces 19 and are in such a relation to these and to the circulating spikes 8, that the nape of the fish lying on a surface 19, the head of which is held by a spike 8, is situated every time directly or almost directly under a knife 20. During the rotation of the turntable 1 the roller 43 of the lever bar 23 slides under the bar 36 (Fig. 8) until it encounters the cam 38 at the end 37 of the bar, whereby the bar 23 is jerkwise oscillated around its fulcrum 41, causing the grippers 32, 33 as also the decapitating knife 20 to descend. The grippers 32, 33, owing to the pressure of the spring 35, bear tightly onto the fish (Fig. 9), and the knife 20 penetrates into the nape of the fish (Fig. 10), whilst the pin 24 slides in the elongated hole 22 of the link 28 influencing the grippers 32, 33. The knife 20 cuts through the nape and the back bone of the fish. Whilst the fish body is held on the turntable 1 by the grippers 32, 33, the head is held by the spike 8 of the band 7 moving tangentially to the turntable 1. Owing to the tangential movement of the head to the trunk, a movement towards the front is first imparted to the head, whereupon through a further pull the thin belly flaps are torn off directly on the head (Fig. 3). The head then continues to travel with the band 7, until it is brushed off the spike 8 by an inclined surface 42 (Fig. 1), the trunk still held by the grippers 32, 33 being carried along by the turntable 1, until the roller 43 comes under the section 39 of the bar 36 mounted on the rod 26. At this instant the rod 26 descends so that, owing to the pressure of the section 39 on the roller 43, the lever bar 23 is oscillated back, in opposition to the action of the spring 35, and the grippers 32, 33 as also the knife 20 rise out of the working position (Fig. 10). The trunk then strikes against a stop 44 which throws it off the surface 19 (Fig. 1).

The way in which the fish is boned and decapitated is described above. If it is desired to cut the boned and decapitated fish into pieces, the forked bar 45, 46 with the knives 49, 50 is placed on the accordingly extended shaft 31. The following operation then takes place:

The fish is held by the grippers 32, 33, until these latter are released by the section 39 at the descending of the rod 26. The rod 26 rises suddenly, when the arm 45 is situated in the section 58 of the guide 47, so that the bar 45, 46 oscillates on its fulcrum 31, the spur wheel 57 rolling on the toothed segment 57 causing the knives 49, 50 to rotate through the intermediary of the spur wheels 55 and 52 so that these knives cut the fish into pieces (Figs. 4, 6 and 12). The knives 49, 50 engage through the incisions 18 in the surfaces 19, and their rotation ceases as soon as they have attained their extreme lower position. The rod 26 then descends, and the sections 39 and 58 arranged thereon in pressing on the lever bar 23 or on the arm 45 of the forked bar 45, 46 lift the grippers 32, 33 or the knives 49, 50 from the operative position into the inoperative position (Fig. 5), the fish sections being then ejected by the stop 44.

If the fish is to be nobbed, that is decapitated, and if the entrails are to be pulled out of the belly cavity which remains closed, the tools 9, 10, 11, 12, 13 and 14 are removed or brought out of engagement with the fish (Fig. 2). Owing to the tangential movement of the head to the trunk, the entrails connected with the head are pulled out of the belly cavity after the tearing off of the belly flaps. The nobbed fish can now be cut up by the knives 49, 50 or ejected from the machine uncut.

I claim:—

1. A fish dressing machine comprising in combination a rotative turntable, a pulley integral with said turntable, equally spaced pins secured to said pulley, a perforated belt in geared relation with said pins, a pair of idler pulleys arranged at remote points from said turntable, fish impaling pins secured to the belt in spaced relation, fish dressing tools arranged on opposite sides of the belt and on said turntable, and means for operating said tools.

2. A fish dressing machine including a rotative turntable, a belt extending around an arc of said turntable and tangentially away therefrom, fish head securing means on said belt, fish body securing clamps on said turntable whereby the head and body of a fish being dressed are separated from each other as the turntable rotates and means to effect automatic opening and closing of said clamps at spaced points in their travel.

3. A fish dressing machine including a rotative turntable, a belt extending around an arc of said turntable and tangentially away therefrom, fish head securing means on said belt, fish body securing clamps on said turntable whereby the head and body of a fish being dressed are separated from each other as the turntable rotates, and means to actuate said clamps operatively controlled by the rotation of the turntable and arranged to cause gripping of the fish adjacent the joint at which the belt approaches the turntable and holding the fish body to the turntable until past the point of divergence of the belt from the turntable.

4. A fish dressing machine including a rotative turntable, a belt extending around an arc of said turntable and tangentially away therefrom, fish head securing means on said belt, fish body securing clamps on said turntable whereby the head and body of a fish being dressed are separated from each other as the turntable rotates, means to effect automatic opening and closing of said clamps at predetermined points in their travel, and a head cutting mechanism arranged to partially sever the head from the body of a fish and located adjacent the point of departure of the belt from the turntable and in advance thereof.

5. A fish dressing machine including a rotatable turntable, a belt extending around an arc of said turntable and tangentially away therefrom, fish head securing means on said belt, fish body securing clamps on said turntable whereby the head and body of a fish being dressed are separated from each other as the turntable rotates, means to actuate said clamps operatively controlled by the rotation of the turntable and arranged to cause gripping of the fish adjacent the point at which the belt approaches the turntable and holding the fish body to the turntable until past the point of divergence of the belt from the turntable, and a head cutting mechanism arranged to partially sever the head from the body of a fish and located adjacent the point of departure of the belt from the turntable and in advance thereof.

6. A fish dressing machine including a rotative turntable, a belt extending around an arc of said turntable and tangentially away therefrom, fish head securing means on said belt, fish body securing clamps on said turntable whereby the head and body of a fish being dressed are separated from each other as the turntable rotates, means to effect automatic opening and closing of said clamps at predetermined points in their travel, idler pulleys spaced from each other and from the turntable and supporting the belt in substantially triangular form, and tools arranged on opposite sides of said belt.

7. A fish dressing machine including a rotative turntable, a belt extending around an arc of said turntable and tangentially away therefrom, fish head securing means on said belt, fish body securing clamps on said turntable whereby the head and body of a fish being dressed are separated from each other as the turntable rotates, means to actuate said clamps operatively controlled by the rotation of the turntable and arranged to cause gripping of the fish adjacent the joint at which the belt approaches the turntable and holding the fish body to the turntable until past the point of divergence of the belt from the turntable, idler pulleys spaced from each other and from the turntable and supporting the belt in substantially triangular form, and tools arranged on opposite sides of said belt.

8. A fish dressing machine including a rotative turntable, a belt extending around an arc of said turntable and tangentially away therefrom, a fish head securing means on said belt, fish body securing clamps on said turntable whereby the head and body of a fish being dressed are separated from each other as the turntable rotates, means to effect automatic opening and closing of said clamps at predetermined points in their travel, a head cutting mechanism arranged to partially sever the head from the body of a fish and located adjacent the point of departure of the belt from the turntable and in advance thereof, idler pulleys spaced from each other and from the turntable and supporting the belt in substantially triangular form, and tools arranged on opposite sides of said belt.

9. A fish dressing machine including a rotatable turntable, a belt extending around an arc of said turntable and tangentially away therefrom, fish head securing means on said belt, fish body securing clamps on said turntable whereby the head and body of a fish being dressed are separated from each other as the turntable rotates, means to actuate said clamps operatively controlled by the rotation of the turntable and arranged to cause gripping of the fish adjacent the point at which the belt approaches the turntable and holding the fish body to the turntable until past the point of divergence of the belt from the turntable, a head cutting mechanism arranged to partially sever the head from the body of a fish and located adjacent the point of departure of the belt from the turntable and in advance thereof, idler pulleys spaced from each other and from the turntable and supporting the belt in substantially triangular form, and tools arranged on opposite sides of said belt.

10. A fish dressing machine comprising in combination a rotative turntable, a pulley integral with said turntable, equally spaced pins secured to said pulley, a perforated belt in geared relation with said pins, a pair of idler pulleys arranged at remote points from said turntable, fish impaling pins secured to the belt in spaced relation, fish dressing tools arranged on opposite sides of the belt and on said turntable, means for operating said tools, and fish body clamps carried by and rotating with the turntable.

11. A fish dressing machine comprising in combination a rotatable turntable, a pulley integral with said turntable, equally spaced pins secured to said pulley, a perforated belt in geared relation with said pins, a pair of idler pulleys arranged at remote points from said turntable, fish impaling pins secured to the belt in spaced relation, fish dressing tools arranged on opposite sides of the belt and on said turntable, means for operating said tools, fish body clamps carried by and rotating with the turntable, one of said pairs of pulleys constituting means for guiding the belt away from the turntable, and a head cutting means arranged to partly sever a fish head from its body, and positioned adjacent said turntable in advance of the point at which the belt moves away from the turntable.

12. A fish dressing machine comprising in combination a rotative turntable, a pulley integral with said turntable, equally spaced pins secured to said pulley, a perforated belt in geared relation with said pins, a pair of idler pulleys arranged at remote points from said turntable, fish impaling pins secured to the belt in spaced relation, fish dressing tools arranged on opposite sides of the belt and on said turntable, means for operating said tools, fish body clamps carried by and rotating with the turntable, one of said pairs of pulleys constituting means for guiding the belt away from the turntable, a head cutting means arranged to partly sever a fish head from its body, and positioned adjacent said turntable in advance of the point at which the belt moves away from the turntable, and operative means for said clamps arranged to hold the clamps in clamping position until past the joint at which the belt diverges away from the turntable.

RUDOLF BAADER.